J. MESSINA.
KITCHEN UTENSIL.
APPLICATION FILED JULY 30, 1915.
1,172,156.                                                    Patented Feb. 15, 1916.
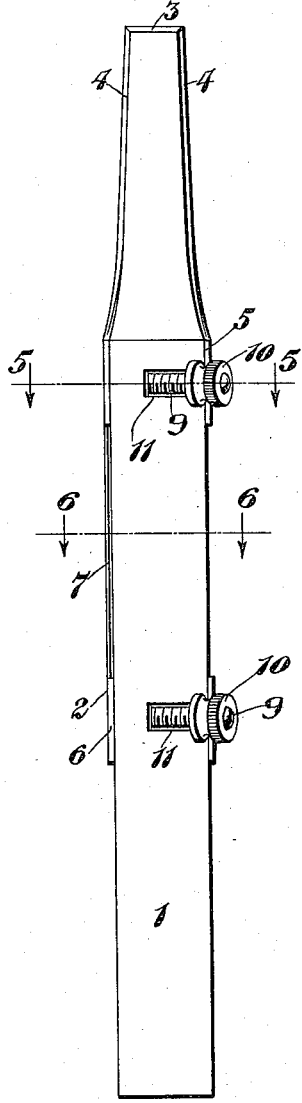
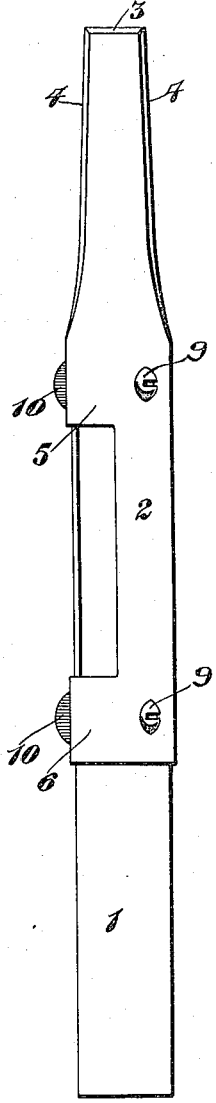
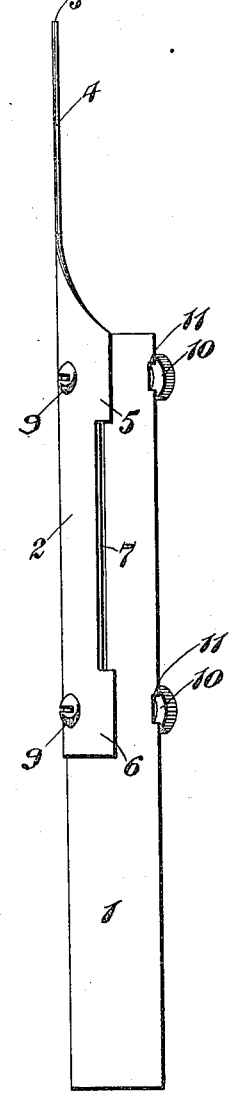
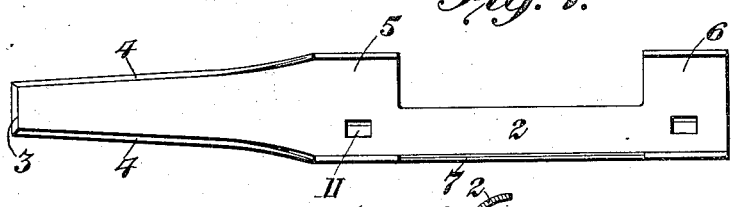
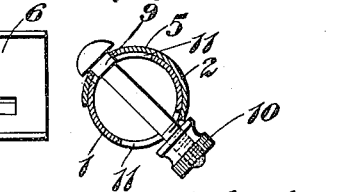
Attest:
Charles A. Becker,
Inventor
J. Messina.
Victor J. Evans,
THE COLUMBIA PLANOGRAPH CO., WASHINGTON, D. C.

UNITED STATES PATENT OFFICE.

JOSEPH MESSINA, OF BENLD, ILLINOIS.

KITCHEN UTENSIL.

1,172,156.  Specification of Letters Patent. Patented Feb. 15, 1916.

Application filed July 30, 1915. Serial No. 42,777.

*To all whom it may concern:*

Be it known that I, JOSEPH MESSINA, a citizen of the United States, residing at Benld, in the county of Macoupin and State of Illinois, have invented new and useful Improvements in Kitchen Utensils, of which the following is a specification.

This invention relates to kitchen utensils and more particularly to vegetable and fruit peelers.

The principal object of the invention is the provision of a device of this character which is simple in construction, efficient in operation, which may be sold for a relatively small amount of money, and which is adapted to varying thicknesses of peeling.

Further objects of the invention will appear as the following specific description is read in connection with the accompanying drawing which forms a part of this application, and in which:—

Figure 1 is a side elevation. Fig. 2 is a similar view showing a different side of the device. Fig. 3 is a similar view showing the device at another angle. Fig. 4 is a plan view of the knife member. Fig. 5 is a detail sectional view on the line 5—5 of Fig. 1. Fig. 6 is a sectional view on the line 6—6 of Fig. 1.

Referring more particularly to the drawings, 1 represents the handle of the device to which is secured, as will be hereinafter described, the blade or knife member 2. This blade or knife member is substantially semi-circular in outline and is curved to fit the handle member 1 and has a longitudinal extension provided with cutting edges 3 and 4. The member 2 is provided with an opening in one side edge defined by parallel lugs or lateral extensions 5 and 6 and upon the opposite edge is provided with a cutting edge or sharpened portion 7. The bolts 9 extend through slots 11 formed in the member 1 and have threaded thereon the locking nuts 10 which hold them in adjusted position and prevent displacement of the parts 1 and 2. The opening in the side of the member 2 corresponds with a similar opening formed in the member 1 so that the peeling removed from the vegetable or fruit by the knife edge 7 can be readily discharged from the device.

The edge 7 is particularly adapted for peeling and is relatively positioned to one lateral edge of the member 1 so as to regulate the thickness of the peeling, as will be readily understood. The cutting edges 4 may be used for peeling or coring while the edges 3 may be used for removing bad places or eyes on fruit or vegetables.

What is claimed is:

A vegetable peeler comprising a hollow tubular member providing a handle and recessed near one end thereof to provide an elongated semi-cylindrical portion, said hollow tubular member having slots above and below said semi-cylindrical portion circumferentially disposed at diametrically opposite points, a concavo-convex blade provided with a reduced portion adapted to overlie the recess in the hollow tubular member, said reduced portion being provided with a cutting edge, bolts passing through the slots in the hollow tubular member and through the blade adjacent said cutting edge, and nuts threadably engaged with the bolts and bearing upon one side edge of the blade distant from the cutting edge thereon.

In testimony whereof I affix my signature in presence of two witnesses.

JOE MESSINA.

Witnesses:
 C. R. EAGLE,
 MAUDE FITZPATRICK.

Copies of this patent may be obtained for five cents each, by addressing the "Commissioner of Patents, Washington, D. C."